(12) United States Patent
Kaushal et al.

(10) Patent No.: US 10,547,576 B1
(45) Date of Patent: Jan. 28, 2020

(54) MODIFYING PRESENTATION OF MESSAGE BASED ON CONTENT IDENTIFIED BY UNIFORM RESOURCE LOCATOR (URL) IN MESSAGE

(71) Applicant: Google Inc., Mountain View, CA (US)

(72) Inventors: Govind Kaushal, San Francisco, CA (US); Prasenjit Sarkar, Sunnyvale, CA (US); Jeroen Jillissen, Campbell, CA (US); Thomas Chao, Burlingame, CA (US)

(73) Assignee: GOOGLE LLC, Mountain View, CA (US)

( * ) Notice: Subject to any disclaimer, the term of this patent is extended or adjusted under 35 U.S.C. 154(b) by 299 days.

(21) Appl. No.: 15/144,097

(22) Filed: May 2, 2016

Related U.S. Application Data

(60) Provisional application No. 62/317,865, filed on Apr. 4, 2016.

(51) Int. Cl.
*H04L 12/58* (2006.01)
*H04L 29/08* (2006.01)
*H04L 12/703* (2013.01)

(52) U.S. Cl.
CPC .......... *H04L 51/063* (2013.01); *H04L 45/28* (2013.01); *H04L 51/18* (2013.01); *H04L 67/02* (2013.01)

(58) Field of Classification Search
CPC ... H04L 29/08072; H04L 29/06; H04L 45/28; H04L 45/54; H04L 67/18; H04W 4/50
USPC ................. 709/220, 224, 227, 228
See application file for complete search history.

(56) References Cited

U.S. PATENT DOCUMENTS

| | | | | |
|---|---|---|---|---|
| 7,065,500 | B2* | 6/2006 | Singh | G06Q 10/087 705/26.1 |
| 8,321,274 | B2* | 11/2012 | Collins | G06F 17/2785 705/14.43 |
| 9,218,413 | B2* | 12/2015 | Skeen | G06F 16/335 |
| 9,285,977 | B1* | 3/2016 | Greenberg | G06F 16/958 |

(Continued)

FOREIGN PATENT DOCUMENTS

EP 2017778 A1 1/2009

OTHER PUBLICATIONS

Yang et al.; Personalized Email Prioritization Based on Content and Social Network Analysis; IEEE Intelligent Systems; Jul./Aug. 2010; www.computer.org/intelligent; 7 pages.

*Primary Examiner* — Khanh Q Dinh
(74) *Attorney, Agent, or Firm* — Brake Hughes Bellermann LLP

(57) ABSTRACT

A non-transitory computer-readable storage medium may comprise instructions stored thereon. When executed by at least one processor, the instructions may be configured to cause a server computing system to at least maintain electronic messages received by a user, at least one of the electronic messages including textual content and a Uniform Resource Locator (URL), retrieve, more than once, a file identified by the URL from a remote server identified by the URL, subsequent to each retrieval, determine whether content of the file identified by the URL meets a trigger condition, and based on determining that the file identified by the URL meets the trigger condition, cause a client computing system associated with the user to modify a presentation of the at least one electronic message that includes the textual content and the URL.

19 Claims, 11 Drawing Sheets

(56) References Cited

U.S. PATENT DOCUMENTS

| | | | | |
|---|---|---|---|---|
| 9,330,192 B1* | 5/2016 | Greenberg | ............ | G06F 16/958 |
| 9,557,889 B2* | 1/2017 | Raleigh | ................ | G06F 3/0482 |
| 9,858,559 B2* | 1/2018 | Raleigh | ................ | G06Q 20/145 |
| 2003/0005067 A1* | 1/2003 | Martin | ................ | G06Q 30/02 |
| | | | | 709/207 |
| 2005/0267944 A1 | 12/2005 | Little et al. | | |
| 2007/0033103 A1* | 2/2007 | Collins | ............... | G06F 17/2785 |
| | | | | 705/14.41 |
| 2007/0168430 A1 | 7/2007 | Brun et al. | | |
| 2007/0174915 A1* | 7/2007 | Gribble | ................ | G06F 21/53 |
| | | | | 726/24 |
| 2009/0119370 A1 | 5/2009 | Stern et al. | | |
| 2010/0094673 A1* | 4/2010 | Lobo | .................... | G06Q 30/02 |
| | | | | 705/14.69 |
| 2013/0132854 A1* | 5/2013 | Raleigh | ................ | G06F 3/0482 |
| | | | | 715/738 |
| 2014/0229251 A1* | 8/2014 | Lim | .................... | G06Q 30/0252 |
| | | | | 705/14.5 |
| 2015/0100490 A1* | 4/2015 | Agapitov | ............... | G06Q 20/14 |
| | | | | 705/44 |
| 2015/0120767 A1* | 4/2015 | Skeen | .................... | G06F 16/335 |
| | | | | 707/754 |
| 2016/0104211 A1* | 4/2016 | Greenberg | ............ | G06F 16/285 |
| | | | | 705/14.72 |
| 2016/0182415 A1* | 6/2016 | Ames | ................ | G06F 16/9535 |
| | | | | 715/752 |
| 2016/0360336 A1* | 12/2016 | Gross | .................... | H04W 4/025 |

\* cited by examiner

MODIFYING PRESENTATION OF MESSAGE BASED ON CONTENT IDENTIFIED BY UNIFORM RESOURCE LOCATOR (URL) IN MESSAGE

RELATED APPLICATIONS

This application is a non-provisional of, and claims priority to, U.S. Provisional Application No. 62/317,865, filed Apr. 4, 2016, entitled "Modifying Presentation of Message Based on Content Identified by Uniform Resource Locator (URL) in Message," the disclosure of which is incorporated herein in its entirety.

TECHNICAL FIELD

This description relates to electronic messaging.

BACKGROUND

Users of electronic devices may send and receive electronic messages to and from each other, and to themselves. With many such messages, it may be difficult to determine which messages to read at a given time.

SUMMARY

According to an example, a non-transitory computer-readable storage medium may comprise instructions stored thereon. When executed by at least one processor, the instructions may be configured to cause a server computing system to at least maintain electronic messages received by a user, at least one of the electronic messages including textual content and a Uniform Resource Locator (URL), retrieve, more than once, a file identified by the URL from a remote server identified by the URL, subsequent to each retrieval, determine whether content of the file identified by the URL meets a trigger condition, and based on determining that the file identified by the URL meets the trigger condition, cause a client computing system associated with the user to modify a presentation of the at least one electronic message that includes the textual content and the URL.

According to an example, a method may comprise maintaining, by a server, electronic messages received by a user, the electronic messages including textual content and at least one Uniform Resource Locator (URL) identifying at least one webpage, retrieving content from the at least one identified webpage, determining priorities of the electronic messages based on the textual content and the retrieved content, and instructing a client device to change a visual appearance of at least one of the electronic messages based on the determined priority.

According to an example, a non-transitory computer-readable storage medium may comprise instructions stored thereon. When executed by at least one processor, the instructions may be configured to cause a server computing system to at least maintain electronic messages associated a user account, at least one of the electronic messages including textual content and a Uniform Resource Locator (URL), constantly monitor a file identified by the URL to determine whether content of the file identified by the URL meets a trigger condition, and based on determining that the file identified by the URL meets the trigger condition, causing a client computing system associated with the user account to modify a presentation of the at least one electronic message that includes the textual content and the URL.

According to an example, a computing system may include means for maintaining electronic messages received by a user, at least one of the electronic messages including textual content and a Uniform Resource Locator (URL), means for retrieving, more than once, a file identified by the URL from a remote server identified by the URL, means for, subsequent to each retrieval, determine whether content of the file identified by the URL meets a trigger condition, and means for, based on determining that the file identified by the URL meets the trigger condition, cause a client computing system associated with the user to modify a presentation of the at least one electronic message that includes the textual content and the URL.

According to an example, a computing system may include means for maintaining electronic messages received by a user, the electronic messages including textual content and at least one Uniform Resource Locator (URL) identifying at least one webpage, means for retrieving content from the at least one identified webpage, means for determining priorities of the electronic messages based on the textual content and the retrieved content, and means for instructing a client device to change a visual appearance of at least one of the electronic messages based on the determined priority.

According to an example, a computing system may include means for maintaining electronic messages associated a user account, at least one of the electronic messages including textual content and a Uniform Resource Locator (URL), means for constantly monitoring a file identified by the URL to determine whether content of the file identified by the URL meets a trigger condition, and means for, based on determining that the file identified by the URL meets the trigger condition, causing a client computing system associated with the user account to modify a presentation of the at least one electronic message that includes the textual content and the URL.

The details of one or more implementations are set forth in the accompanying drawings and the description below. Other features will be apparent from the description and drawings, and from the claims.

DETAILED DESCRIPTION

Users may send each other electronic messages, such as emails and/or text messages, and/or may send themselves electronic messages. The electronic messages may include textual content and Uniform Resource Locators (URLs) referencing webpages which include content. A message server and/or client device may retrieve the content from the referenced webpages, and prioritize messages based on both the textual content and the retrieved content on the webpages, to determine which messages to present to a user for review at a given time. The message server and/or client may alter the visual appearance of prioritized messages, such as by moving prioritized messages to a top of a list of messages or adding a visual indicator such as a star or text on or near the prioritized messages, to increase the likelihood that the user will view and/or read the prioritized messages.

Figure 1:
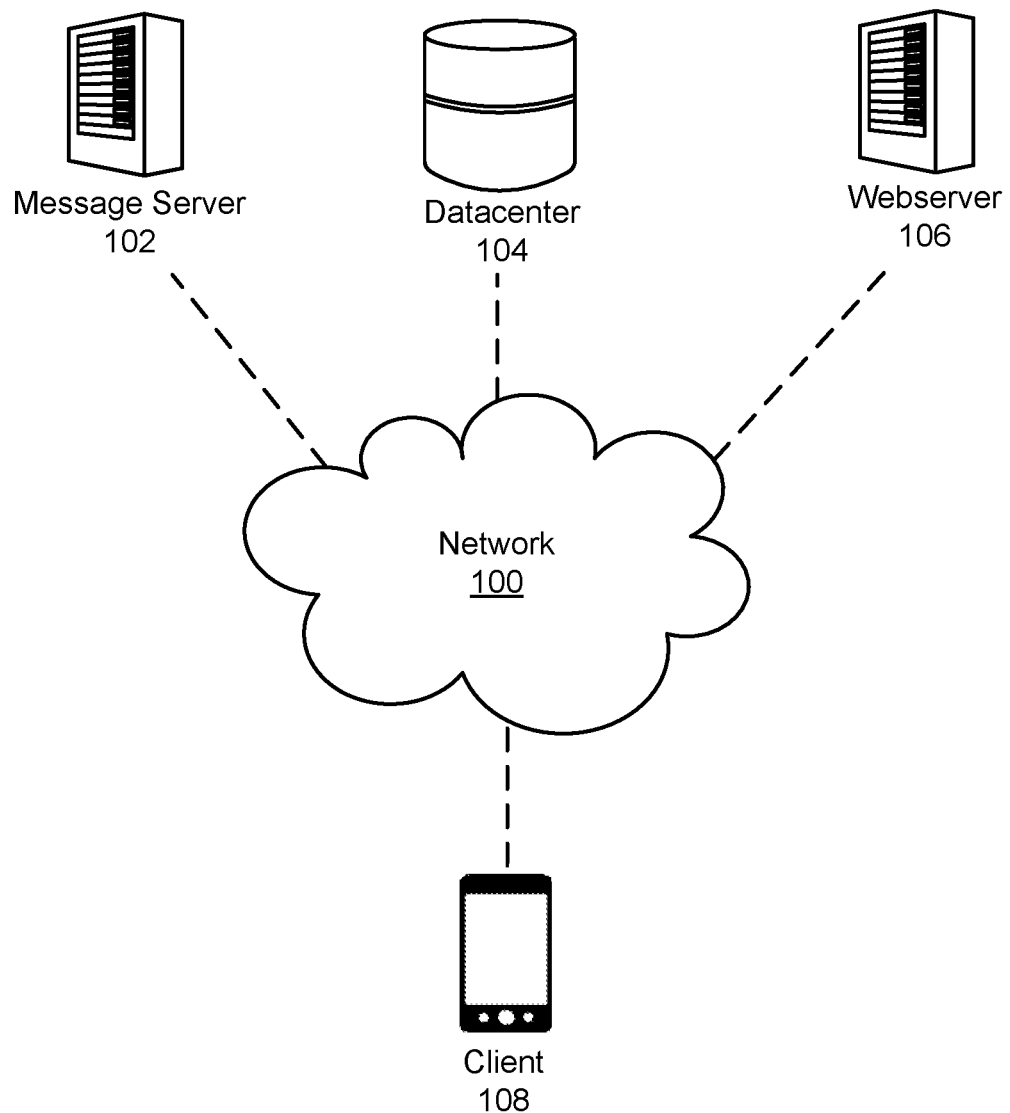
FIG. 1 is a diagram showing computing devices that communicate via a network according to an example implementation.

FIG. 1 is a diagram showing computing devices that communicate via a network 100 according to an example implementation. In this example, the computing devices may include a message server 102. The message server 102 may also be referred to as a server computing system and/or as a server. The message server 102 may receive electronic messages from user accounts that are sent and/or addressed to other user accounts, or messages that a user account sends to himself or herself at a same user account. The electronic messages may include emails, text messages, messages sent within a social network, or other message. The message server 102 may send the messages to a client device 108, which may also be referred to as a client computing system, associated with the user account to which the messages are sent and/or addressed.

The message server 102 may also modify, and/or instruct the client device 108 to modify, appearances of the messages. The message server 102 may modify the appearance of the messages based on a determined importance and/or priority of each of the messages. The message server 102 may determine the importance and/or priority of the messages based on the content of the messages, who the messages are from, and/or contextual information about the user account and/or client device 108. For example, if the content of the message includes information about a subject that the message server 102 has determined that the user is interested in, such as a particular sport, hobby, or person, then message server 102 may determine that the message may have a greater importance and/or higher priority than if the message does not include information about a subject that the message server 102 has determined that the user is interested in. If the sender of the message is a user account that the user frequently sends messages to and/or replies to messages from, then the message server 102 may determine that the message has a greater importance and/or higher priority. If the message describes a location that the user and/or client device 108 is near, then the message server 102 may determine that the message has greater importance and/or higher priority. If the message describes an appointment and/or deadline which is close to the present time, then the message server 102 may determine that the message has greater importance and/or higher priority. Functions performed with respect to the messages that are described herein with respect to the message server 102 may also be performed by the client device 108, and/or distributed between the message server 102 and client device 108.

Some messages may include Uniform Resource Locators (URLs), from which the message server 102 and/or client device 108 may generate hyperlinks, included in the messages, to webpages identified by the URLs on the World Wide Web within the Internet. In determining the importance and/or priority of messages, the message server 102 and/or client device 108 may consider both the content of the original message (which may be textual), and the content of the webpage (which may also be textual) referred to by the URL included in the message. The message server 102 and/or client device 108 may, for example, copy the content from the webpage referred to, and substitute the copied content for the URL to generate a message that includes the original textual content and the content from the webpage, and determine the importance and/or priority of the message based on the original content and the content from the webpage.

Content of webpages may change dynamically. For example, webpages may advertise tickets to sporting events or theater, where the inventory of tickets may steadily decline until the tickets have sold out, may advertise prices of items for sale, where the prices may decline when the items go on sale, or may describe stock prices that may fluctuate up or down. The importance and/or priority of a message with a URL may increase based on the contents of the referred-to webpage when few tickets are left, prices have declined, and/or stock prices have reached a specified value. The importance and/or priority may increase when a trigger event occurs and/or a trigger threshold is met, such as when fewer than a threshold number of tickets offered for sale at the webpage are left, a sale of an item featured at the webpage has commenced, the price of an item offered for sale at the webpage has gone below a threshold price and/or declined by a threshold value or percentage, and/or items such as stocks featured on the webpage have reached a threshold value and/or had their value change by at least a threshold amount.

The message server 102 may retrieve the content of webpages from a datacenter 104 included in the computing devices shown in FIG. 1 and/or directly from a webserver 106 included in the computing devices shown in FIG. 1. The datacenter 104 may be a storage facility managed by a same entity as the message server 102, and may store content, such as Hypertext Markup Language (HTML) content, of many webpages. The webserver 106 may store webpages, which may include HTML content, on behalf of a particular entity, and may respond to Hypertext Transfer Protocol (HTTP) requests for files such as webpages by sending the files to the requesting computing system. While one webserver 106 is shown in FIG. 1, many different webservers may store webpages and respond to requests for files. The message server 102 may repeatedly request the files from the datacenter 104 and/or webserver 106 to obtain, monitor, and/or review the most recent content of a webpage. The message server 102, datacenter 104, webserver 106, and/or client device 108 may communicate with each other via one or more networks 100, which may include the Internet, a local area network (LAN), or a wide area network (WAN), as non-limiting examples.

Figure 2:
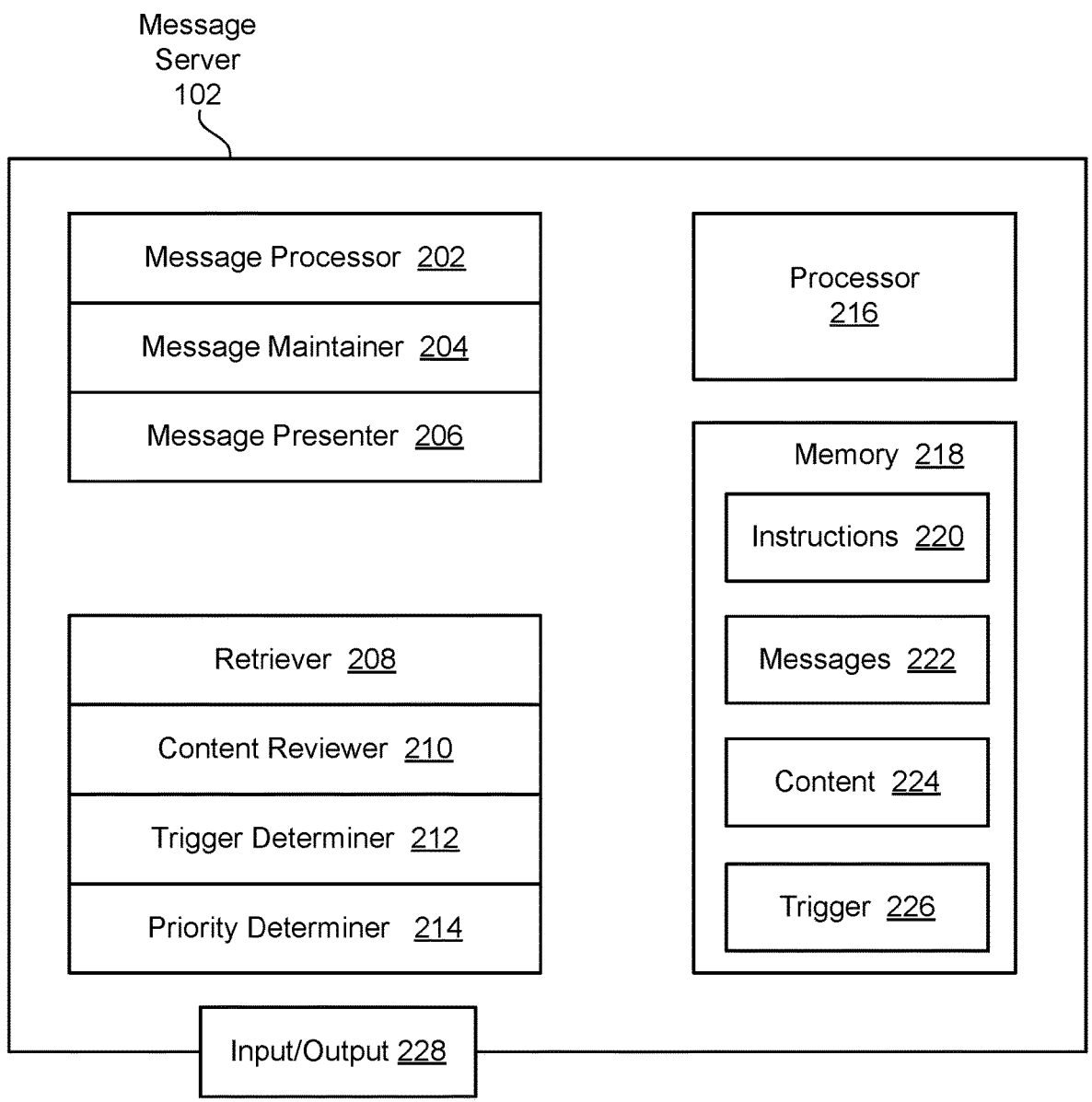
FIG. 2 is a diagram showing a message server according to an example implementation.

FIG. 2 is a diagram showing the message server 102 according to an example implementation. While functions are described herein as being performed by the message server 102, any combination of these functions may be performed by the client device 108 or a combination of the client device 108 and the message server 102.

The message server 102 may include a message processor 202. The message processor 202 may process messages sent and received by the message processor 202, such as by encoding and decoding the messages, encrypting and decrypting the messages, and/or determining who the messages are to and from. The message server 102 may also include a message maintainer 204. The message maintainer 204 may maintain electronic messages, at least one of which may include both textual content and a Uniform Resource Locator (URL) (which may also be referred to as a Universal Resource Locator), by storing the messages. The message maintainer 204 may store the messages in a memory 218 associated with and/or included in the message server 102, and/or in a remote storage site such as the datacenter 104 shown and described with respect to FIG. 1.

The message server 102 may also include a message presenter 206. The message presenter 206 may present, and/or generate and send instructions for presenting, the messages. The message presenter 206 may present and/or generate and send instructions for presenting messages based on a number of parameters, including a timestamp and/or time of sending or receipt of the messages, who the messages are from, a subject line and/or content of the messages, and/or the determined importance and/or priority of the messages. In an example implementation, the messages may be presented in chronological order, with most recent messages on top, with exceptions that messages that are determined to be more important and/or have higher priority may have their location on a display changed such as by moving them closer to the top than their timestamp and/or time of sending or receipt would otherwise indicate. In an example implementation, the message presenter 206 may change a color of important and/or higher priority messages, generate an icon such as a star adjacent to the important and/or higher priority messages, and/or add a textual description of the content to the message which may be based on the content retrieved from the webpage.

The message server 102 may include a retriever 208. The retriever 208 may retrieve files, such as webpages, and/or content, such as HTML content, identified by URLs included in messages. The retriever 208 may retrieve the files and/or content from the datacenter 104, which may have retrieved the files and/or content from the webservers 106, and/or may retrieve the files and/or content directly from the webservers 106.

The message server 102 may include a content reviewer 210. The content reviewer 210 may review the contents of electronic messages. If the content reviewer 210 determines that the electronic messages include any URLs, the content reviewer 210 may instruct the retriever 208 to retrieve the file and/or content identified by the URL(s) included in the message. The content reviewer 210 may review the contents of the files and/or content retrieved by the retriever 210. The content reviewer 210 may determine whether the contents of the file and/or content retrieved by the retriever 210, and/or the content of the original message, is associated with any subjects that the user account associated with the recipient of the electronic message is interested in.

The message server 102 may include a trigger determiner 212. The trigger determiner 212 may determine whether any trigger conditions associated with content of messages, and the files and/or content associated with URLs included therein, have been met. The trigger determiner 212 may determine whether trigger conditions have been met based on a location of the client device 108 being proximal to a location identified by a retrieved webpage, such as a location of a store or restaurant, determining that inventory for an item offered for sale at the at least one webpage has dropped below a threshold, determining that a price of an item offered for sale at the at least one identified webpage has dropped by at least a threshold amount, determining that a sale of an item featured at the at least one webpage has commenced, and/or determining that a value of an item monitored at the at least one identified webpage has changed by at least a threshold amount. These are merely examples of conditions for determining that a trigger condition has been met based on content of the file and/or webpage associated with the URL.

The message server 102 may include a priority determiner 214. The priority determiner 214 may determine priorities and/or importances of the messages based on the original content and/or textual content of the messages themselves, as well as based on the retrieved content, which may be the file and/or HTML content retrieved by the retriever 208 based on the URL included in the message. The priority determiner 214 may, for example, determine that a message has a greater importance and/or higher priority based on the trigger determiner 212 determining that a trigger condition has been met. The priority determiner 214 may also determine the importance and/or priority of the messages based on the textual content of the messages and the retrieved content, information about the user account, and contextual information such as time and location of the client device 108. The priority determiner 214 may, for example, determine that messages with textual and/or retrieved content associated with the user's interests have higher priority, messages with textual and/or retrieved content describing a location near the user's location and/or the location of the client device 108 have greater importance and/or higher priority, and/or messages with textual and/or retrieved content describing an event with a time close to the present time have greater importance and/or higher priority.

The message server 102 may include at least one processor 216. The at least one processor 216 may be capable of executing instructions, such as instructions 220 stored in memory 218, to perform any combination of the functions, methods, and/or techniques described herein.

The message server 102 may include at least one memory device 218. The memory device 218 may include a non-transitory computer-readable storage medium. The memory device 218 may include instructions 220. The instructions 220, when executed by at least one processor, such as the at least one processor 216, may cause the message server 202 to perform any combination of the functions, methods, and/or techniques described herein.

The memory device 218 may store the messages 222. The memory device 218 may store the messages 222 including text, any files attached to the messages, any font changes or other effects, and the URLs included in the messages. The memory device 218 may also store the retrieved content 224. The retrieved content 224 may have been retrieved by the retriever 208 based on the URLs included in the messages 222, and may include files, webpages, and/or HTML content. The memory device 218 may also store one or more triggers 226. The triggers 226 may include conditions based upon which the trigger determiner 212 determines that trigger conditions have been met, such as threshold inventory levels, threshold prices or values, or price or value drops. The user may provide trigger parameters and/or trigger conditions, or the message server 102 may determine the trigger conditions based on machine learning algorithms.

The message server 102 may include at least one input/output node 228. The input/output node 228 may include one or more input interfaces and one or more output interfaces. The input interfaces and output interfaces may include wired or wireless nodes for communicating with other computing systems, such as servers. The input interface(s) may include a keyboard, mouse, touchscreen, and/or microphone, as non-limiting examples. The output interface(s) may include a display and/or speaker, as non-limiting examples.

Figure 3A:
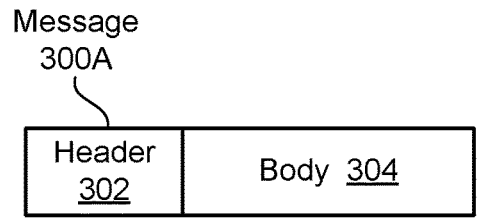
FIG. 3A is a block diagram showing fields of a message according to an example implementation.

FIG. 3A is a block diagram showing fields of a message 300A according to an example implementation. The message server 102 may have received the message 300A, and the message processor 202 may have processed the message 300A.

As shown in FIG. 3A, the message 300A may include a header 302 and a body 304. The header 302 may include identities and/or addresses of a sender and/or recipient of the message 300A. In an example in which the message 300A is an email message, the header 302 may include a to field indicating an address, such as an email address, of a primary recipient(s), a cc field, indicating an address, such as an email address, of a secondary recipient(s), a bcc field, indicating an address, such as an email address, for blind carbon copies, a from field indicating a person or account who created the message 300A, a sender field indicating an address, such as an email address, of a sender of the message 300A, a received field added by transfer agents along a route traveled by the message 300A, a return-path field identifying a path back to the sender, a date field indicating a date and time the message was sent, a reply-to field indicating an address, such as an email address, to which replies should be sent, a message-id field including a unique number for referencing the message 300A later, an in-reply-to field identifying a message to which the message 300A is a reply, a references field indicating other relevant message identifiers, a keywords field including user-chosen keywords, and/or a subject field which may include a short summary of the message for a one-line display.

The body 304 may include the content of the message 300A. The content may include text and/or textual content, and a Uniform Resource Locator (URL). The URL may refer to a webpage that another user may like the user to read, or a webpage that the user has sent to himself or herself for later reference. The URL may have been copied and pasted from a browser into the message 300A.

Figure 3B:
FIG. 3B is a diagram showing the message being displayed on a user device according to an example implementation.

FIG. 3B is a diagram showing the message 300B being displayed on a user device according to an example implementation. The message 300B shows the message 300A being displayed in a browser or messaging application. In this example, the message 300B includes a from field 306 indicating that "Bob" sent the message 300B, a to field 308 indicating that the message was sent to "Joe," a subject field 310 indicating the subject of the message as, "Check this out!," a body including text 312, "Check this out:," and a URL 314, "www.awesomesite.com". The message presenter 206 may have converted the URL 314 into a hyperlink, so that the user may click on the hyperlink and retrieve and/or visit the webpage identified by the URL 314.

Figure 3C:
FIG. 3C shows a browser displaying contents of a webpage identified by a Uniform Resource Link (URL) included in the message according to an example implementation.

FIG. 3C shows a browser 320 displaying contents of a webpage identified by the URL 314 included in the message 300B according to an example implementation. The client device 108 may have launched the browser 320 with the URL 314 in response to the user clicking on the hyperlink generated by the message presenter 206. As shown in FIG. 3C, the browser 320 may include an address bar 322 with the URL 314, "www. awesomesite.com". The browser 320 may include content 324, in this example text, "Buy A for X dollars!," in an example in which the content 324 describes an item, A, for sale, for X dollars.

The content reviewer 210 may modify the body 304 by copying the text from the webpage identified by the URL 314 and inserting the contents of the webpage into the text 312 and/or body 304 of the message 300A, 300B. The priority determiner 214 may determine the importance of the message 300A, 300B based on the textual content of the message 300A, 300B with the content of the webpage inserted into the message 300A, 300B.

Figure 3D:
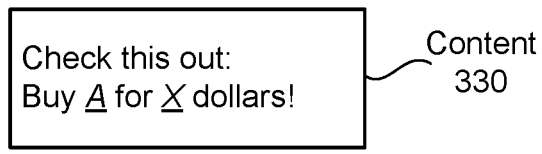
FIG. 3D shows textual content included in the message and content from the webpage according to an example implementation.

FIG. 3D shows textual content included in the message and content from the webpage according to an example implementation. In this example, the content 324 of the webpage has been inserted into the text 312 of the message 300A, 300B, to generate content 330, "Check this out: Buy A for X dollars!" The priority determiner 214 may determine the priority of the message 300A, 300B based on the generated content 330. The message presenter 206 may change the visual appearance of the message 300A, 300B based on the determined priority.

Figure 3E:
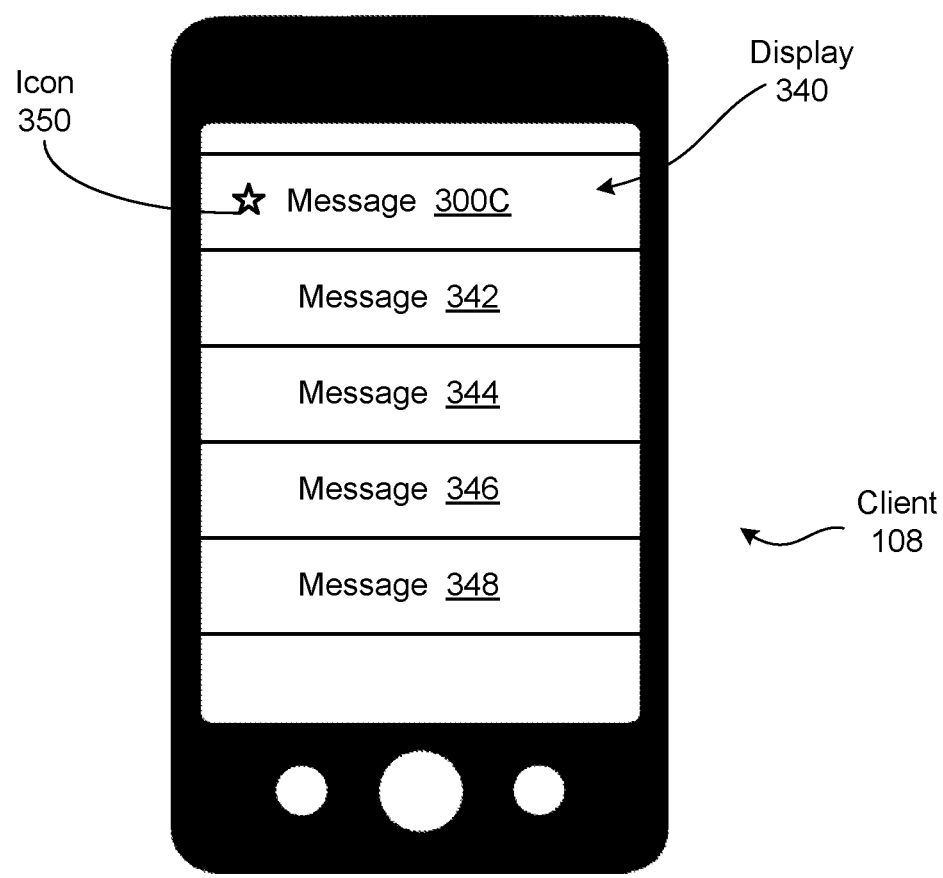
FIG. 3E shows messages displayed on a client device according to an example implementation.

FIG. 3E shows messages 300C, 342, 344, 346, 348 displayed on the client device 108 according to an example implementation. The client device 108 may display the messages 300C, 342, 344, 346, 348 on a display 340 of the client device 108.

In this example, the priority determiner 214 has determined that the message 300C, which is a representation of the message 300A, 300B, has higher priority and/or is more important than messages 342, 344, 346, 348. The message presenter 206 may have changed the visual appearance of the message 300C by moving the message 300C to the top of the display 340, increasing the likelihood of the user noticing the message 300C, changing a color of the message 300C, and/or by adding an icon 350, such as a star, to the message 300C and/or adjacent to the message 300C. The message presenter 206 may also alter the visual appearance of the message 300C by adding a textual description of the trigger condition being met.

Figure 3F:
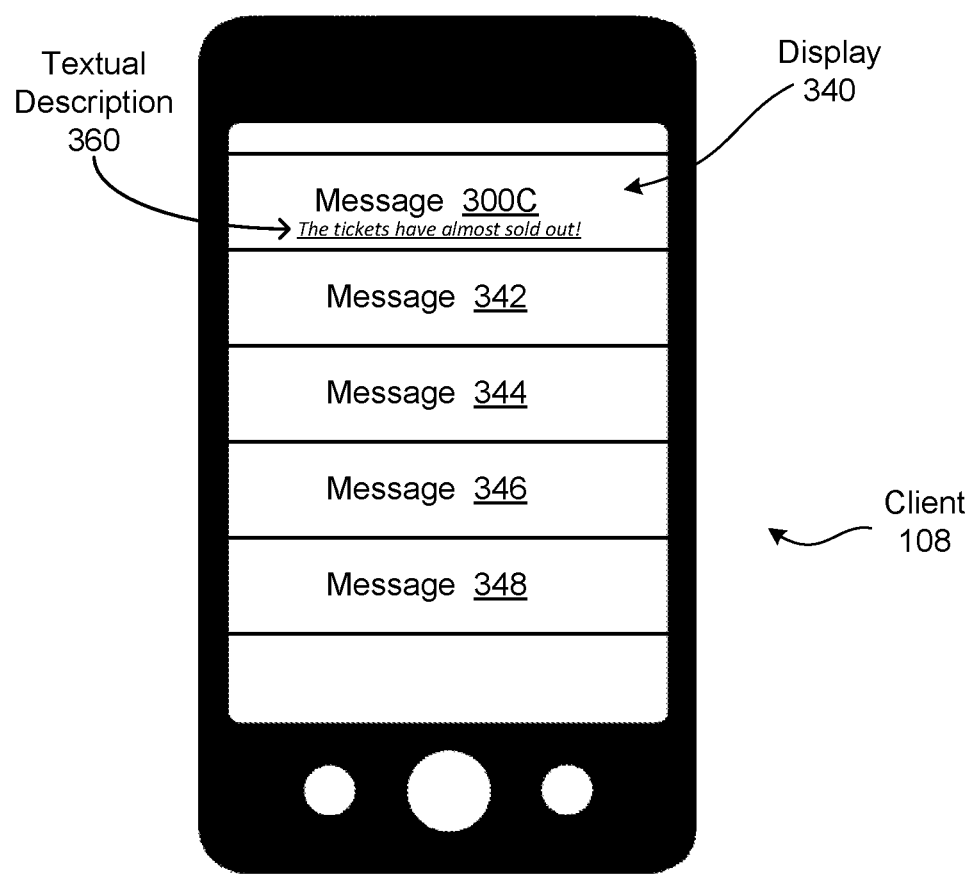
FIG. 3F shows messages displayed on the client device with a textual description of a trigger condition being met according to an example implementation.

FIG. 3F shows messages 300C, 342, 344, 346, 348 displayed on the client device 108 with a textual description 360 of the trigger condition being met according to an example implementation. In this example, the message presenter 206 has added the textual description, "The tickets have almost sold out!," describing inventory for sale at the webpage identified by the URL dropping below a threshold. As non-limiting examples, the message presenter 206 may add a textual description 360 of being close to a restaurant identified by the retrieved webpage (e.g., "You're near Grandma's Grill"), a textual description 360 of inventory described by the retrieved webpage dropping below a threshold (e.g., "Tickets to Rock Stars have almost sold out"), or a textual description 360 of a price of an item offered for sale at the webpage dropping (e.g., "The price of gizmos has dropped").

Figure 4:
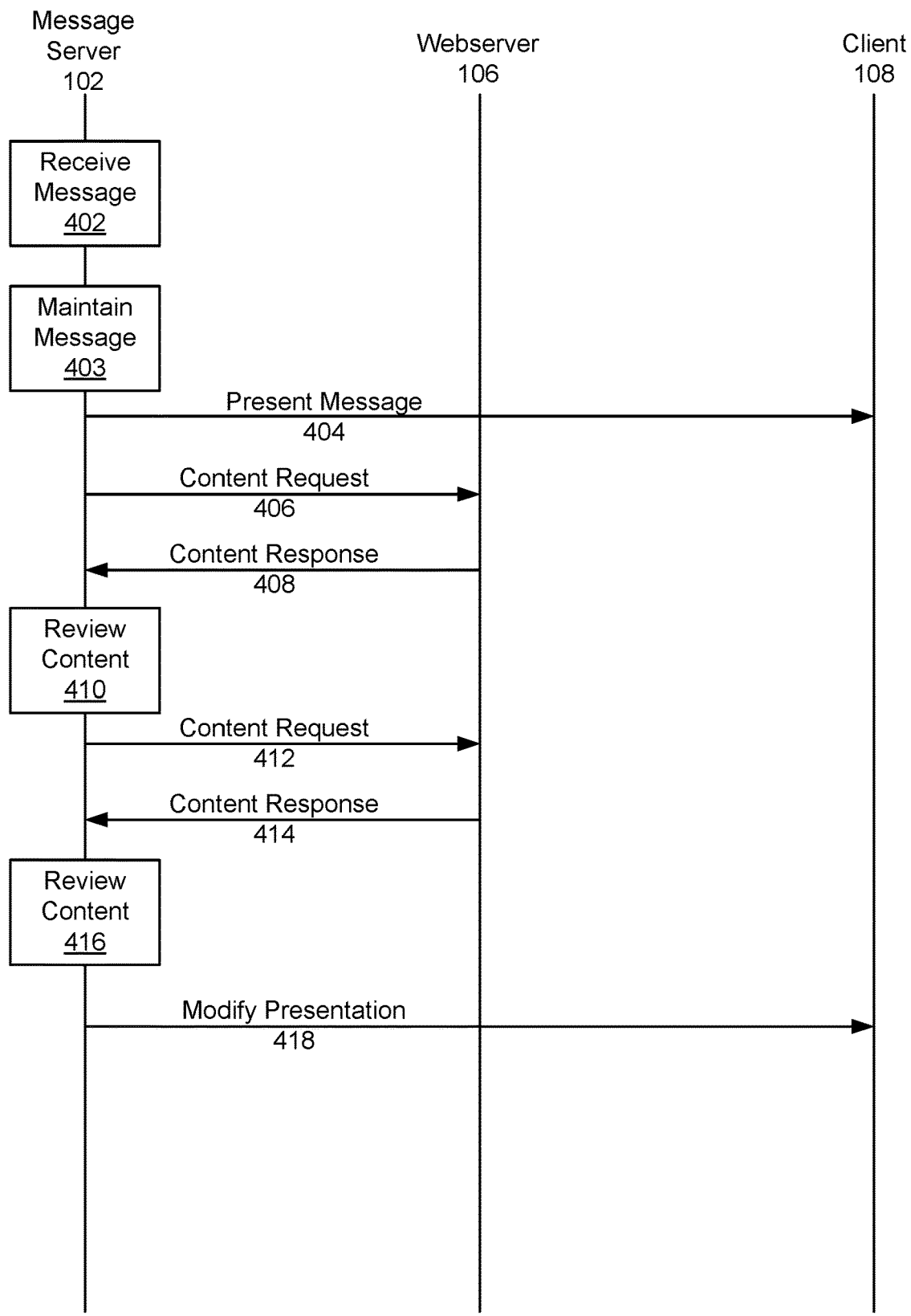
FIG. 4 is a timing diagram showing messages sent and functions performed by the message server, a webserver, and the client device according to an example implementation.

FIG. 4 is a timing diagram showing messages sent and functions performed by the message server 102, the webserver 106, and the client device 108 according to an example implementation. Functions described as being performed by the message server 402 may performed by any combination of the message server 102 and datacenter 104

(shown in FIG. 1). For example, the datacenter 104 may retrieve content from the webserver 106, and the message server 102 may retrieve the content from the datacenter 104.

The message center 102 may receive a message (402). The message server 102 may receive a message, such as the message 300A, from another server, from another client device, or from the client device 108. The message server 102 may also maintain the message (403). The message server 102 may maintain the message (403) by storing the message 300A and/or processing the message.

The message server 102 may present the message, such as in a message 300B, 300C format shown and described with respect to FIG. 3B or FIG. 3E. The message server 102 may present the message by sending a present message instruction 404 to the client device 108. The present message instruction 404 may include an instruction to present the message 300B, 300C, a format in which to present the message, and the contents of the message, such as the message 300A parts shown and described with respect to FIG. 3A.

The message server 102 may request content from the webserver 106. The message server 102 may request the content by sending a request content message 406 to the webserver 106. The request content message 406 may include the URL 314 included in the message. The webserver 106 may respond to the request content message 406 by sending a content response 408 to the message server 102. The content response 408 may include the file, and/or contents of the webpage, identified by the URL 314.

The message server 102 may review the content (410) of the file and/or contents of the webpage received from the webserver 106. The priority determiner 214 may determine whether the contents of the file and/or webpage received from the webserver 106 are sufficient to increase the importance of the message 300A and modify the appearance of the message 300B, 300C. In this example, the priority determiner 214 may determine that the importance and/or priority of the message 300A is not high enough to modify the appearance of the message 300B, 300C, and the message server 102 may repeatedly request content (412) from the webserver 106 and the webserver 106 may send content responses 414 to the message server 102.

After receiving the updated content 414 from the webserver 106, the message server 102 may again review the content (416). If trigger determiner 212 determines that the content of the file and/or webpage received from the webserver 106 meets a trigger condition, and/or the priority determiner 214 determines that the message 300A, 300B, 300C is sufficiently important and/or has high enough priority, the message server 102 may modify the presentation of the message 300B, 300C. The message server 102 may modify the presentation of the message 300B, 300C by sending a modify presentation message 418 to the client device 108, which may result in the client device 108 modifying a visual appearance of the message 300B, 300C, such as by changing a color of the message 300B, 300C, changing a location of the message 300B, 300C on the display 340, generating an icon 350 on and/or adjacent to the message 300B, 300C, and/or adding a textual description of the retrieved content.

Figure 5:
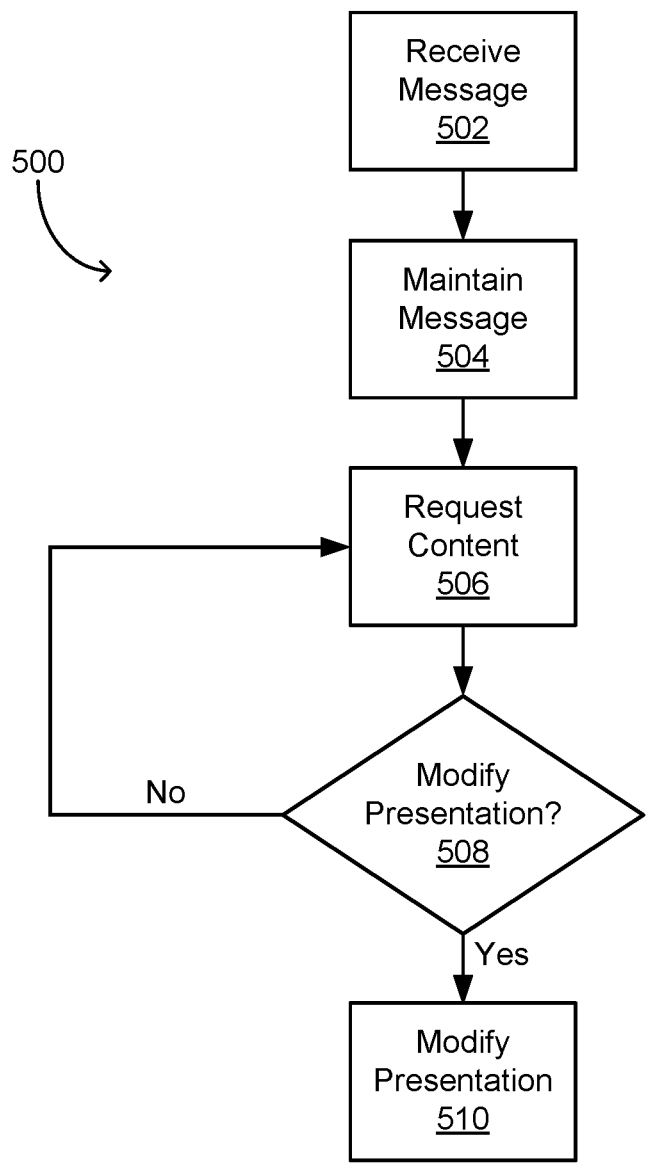
FIG. 5 is a flowchart showing a method performed by the message server according to an example implementation.

FIG. 5 is a flowchart showing a method 500 performed by the message server 102 according to an example implementation. The message server 102 may receive a message (502). The message server 102 may receive the message from other servers, other client devices, or the client device 108 associated with the user and/or user account to whom the message is sent.

The message server 102 may maintain the message (504). The message server 102 may maintain the message by storing the message and/or parsing the message to determine whether the message includes any URLs.

If the message includes a URL, the message server 102 may request content (506), such as a file or webpage identified by the URL, from a webserver 106 identified by the URL. After receiving the content from the webserver 106, the message server 102 may determine whether to modify the presentation of the message (508), such as by determining whether a trigger condition has been met or a priority or importance of the message has sufficiently increased, based in part on the content received from the webserver 106.

If the message server 102 determines not to modify the presentation of the message, then the message server 102 may continue requesting content (506) identified by the URL and determining whether to modify the presentation (508). If the message server 102 determines to modify the presentation, then the message server 102 may modify the presentation of the message (510), such as by sending the client device 108 an instruction to modify the presentation of the message.

Figure 6:
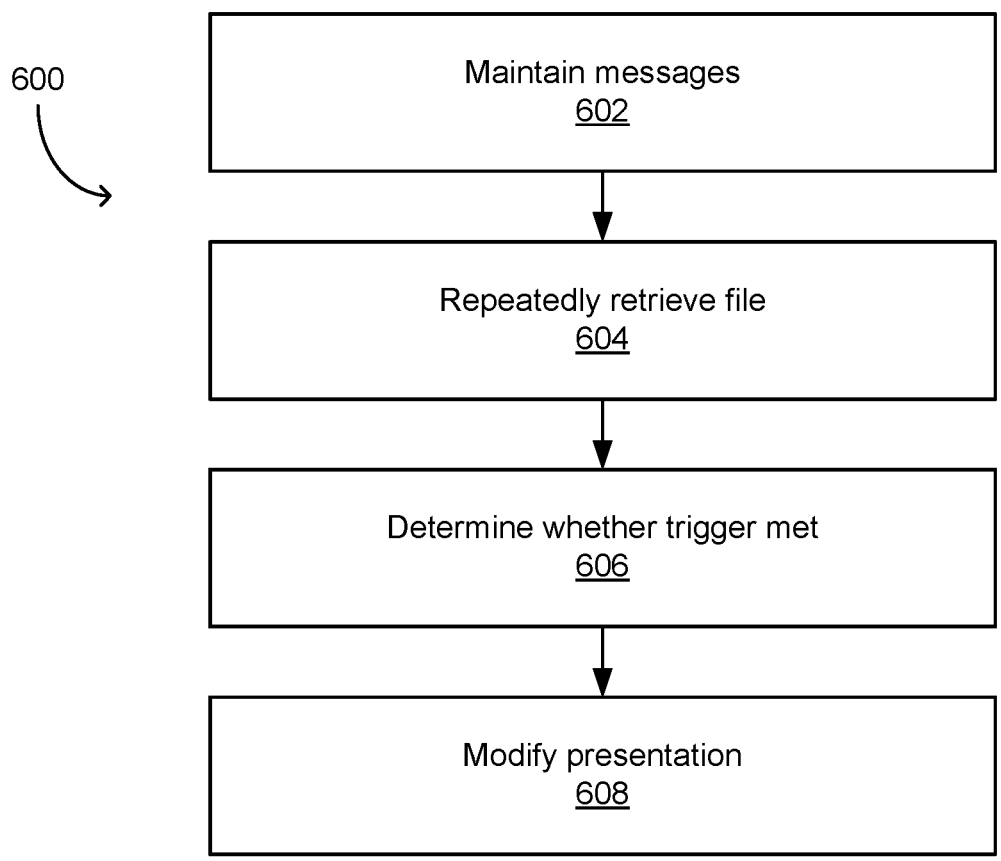
FIG. 6 is a flowchart showing a method performed by the message server according to another example implementation.

FIG. 6 is a flowchart showing a method 600 performed by the message server 102 according to another example implementation. The method 600 may include maintaining electronic messages received by a user, at least one of the electronic messages including textual content and a Uniform Resource Locator (URL) (602). The method 600 may include retrieving, more than once, a file identified by the URL from a remote server identified by the URL (604). The method 600 may include, subsequent to each retrieval, determining whether content of the file identified by the URL meets a trigger condition (606). The method 600 may include, based on determining that the file identified by the URL meets the trigger condition, cause a client computing system associated with the user to modify a presentation of the at least one electronic message that includes the textual content and the URL (608).

According to an example implementation, the trigger condition may include a price of an item, which is described by the file, meeting or passing a threshold.

According to an example implementation, the presentation of the at least one electronic message includes a hyperlink to the file.

According to an example implementation, the modifying the presentation of the at least one electronic message may include adding a textual description of the trigger condition being met.

Figure 7:
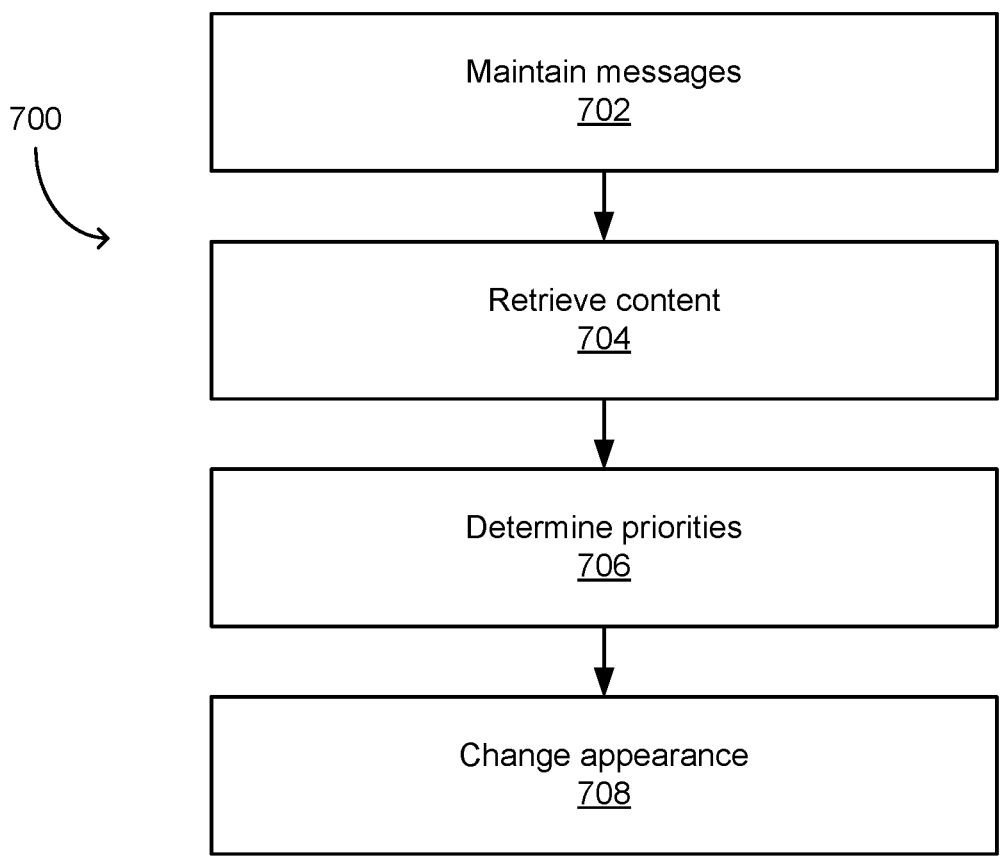
FIG. 7 is a flowchart showing a method performed by the message server according to another example implementation.

FIG. 7 is a flowchart showing a method 700 performed by the message server 102 according to another example implementation. The method 700 may include maintaining, by a server, electronic messages received by a user, the electronic messages including textual content and at least one Uniform Resource Locator (URL) identifying at least one webpage (702). The method 700 may include retrieving content from the at least one identified webpage (704). The method 700 may include determining priorities of the electronic messages based on the textual content and the retrieved content (706). The method 700 may include instructing a client device to change a visual appearance of at least one of the electronic messages based on the determined priority (708).

According to an example implementation, the method 700 may further include inserting text included in the at least one identified webpage into the textual content of the at least one electronic message. The determining whether content of the file identified by the URL meets the trigger condition may include determining whether the at least one message with the inserted text meets the trigger condition.

According to an example implementation, the method 700 may further include copying Hypertext Markup Language (HTML) content stored in a datacenter in association with the at least one identified webpage and inserting the copied HTML content into the textual content. The determining whether content of the file identified by the URL meets the trigger condition may include determining whether the at least one message with the copied HTML content meets the trigger condition.

According to an example implementation, the retrieving content may comprise retrieving Hypertext Markup Language (HTML) content from a server identified by the at least one identified webpage and inserting the retrieved HTML content into the textual content.

According to an example implementation, the determining priorities may comprise determining that inventory for an item offered for sale at the at least one webpage has dropped below a threshold.

According to an example implementation, the determining priorities may comprise determining that a price of an item offered for sale at the at least one identified webpage has dropped by at least a threshold amount.

According to an example implementation, the determining priorities may comprise determining that a sale of an item featured at the at least one webpage has commenced.

According to an example implementation, the determining priorities may comprise determining that a value of an item monitored at the at least one identified webpage has changed by at least a threshold amount.

According to an example implementation, the changing the visual appearance may comprise changing a color of the electronic message.

According to an example implementation, the changing the visual appearance may comprise changing a location of the electronic message on a display.

According to an example implementation, the changing the visual appearance may comprise generating an icon adjacent to the electronic message.

According to an example implementation, the changing the visual appearance may comprise adding a textual description of the retrieved content.

According to an example implementation, the electronic messages may comprise at least one hyperlink to the at least one webpage identified by the URL.

According to an example implementation, the method 700 may further include, after retrieving the content from the at least one identified webpage, retrieving updated content from the at least one identified webpage, determining updated priorities of the electronic messages based on the textual content and the updated retrieved content, and instructing the client device to change the visual appearance of the at least one of the electronic messages based on the updated determined priority.

Figure 8:
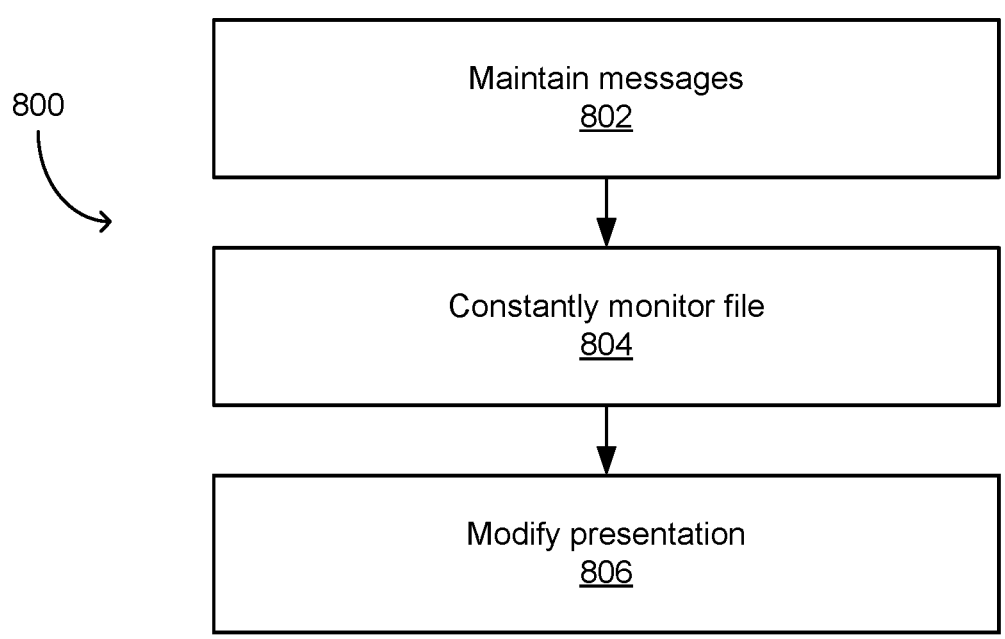
FIG. 8 is a flowchart showing a method performed by the message server according to another example implementation.

FIG. 8 is a flowchart showing a method 800 performed by the message server 102 according to another example implementation. In this example, the method 800 may include maintaining electronic messages associated a user account, at least one of the electronic messages including textual content and a Uniform Resource Locator (URL) (802). The method 800 may also include constantly monitoring a file identified by the URL to determine whether content of the file identified by the URL meets a trigger condition (804). The method 800 may also include, based on determining that the file identified by the URL meets the trigger condition, causing a client computing system associated with the user account to modify a presentation of the at least one electronic message that includes the textual content and the URL (806).

According to an example implementation, the method 800 may further include receiving at least one trigger parameter in association with the user account. The trigger condition may be based on the received at least one trigger parameter.

Figure 9:
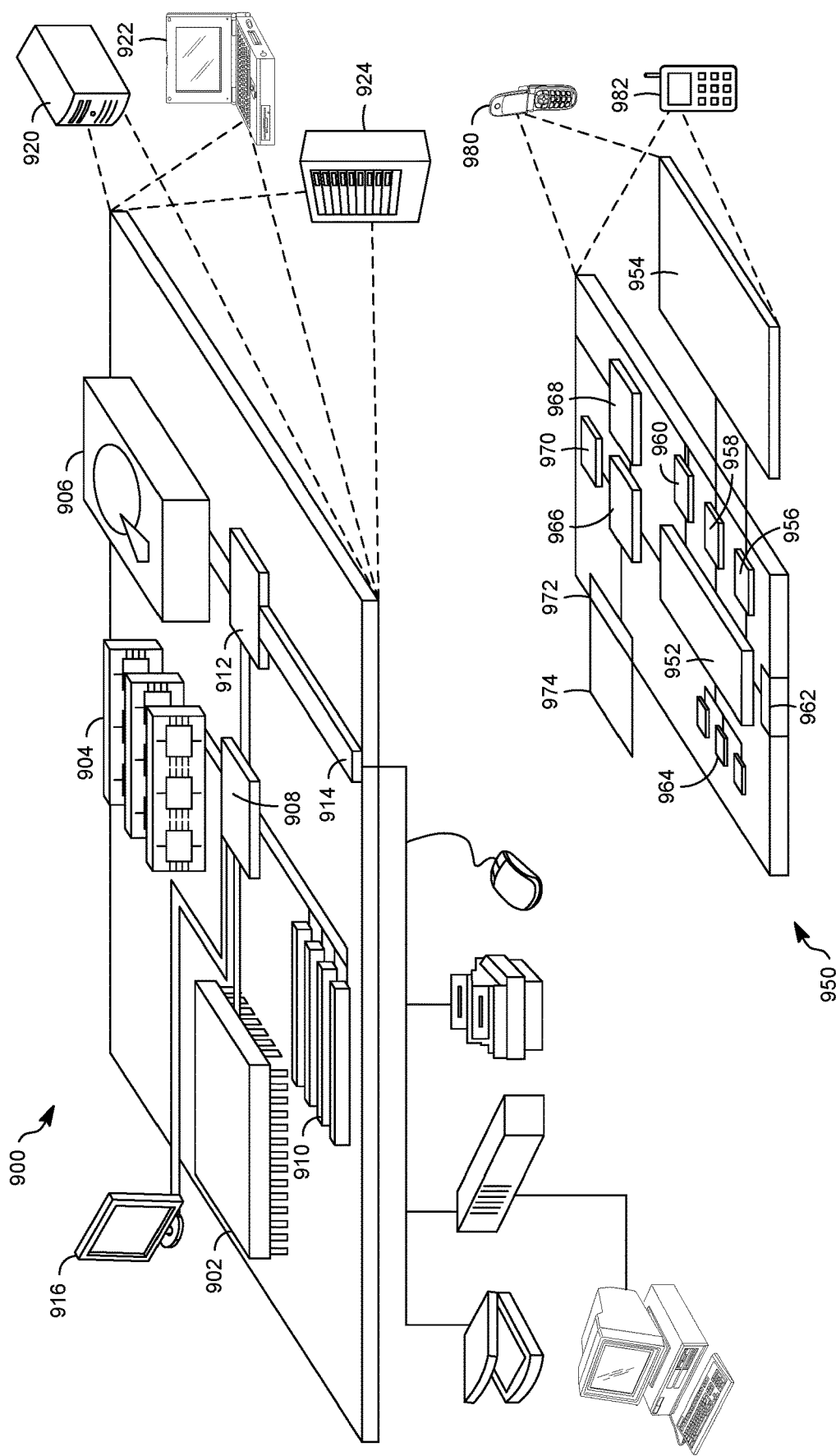
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a server computing system to at least:

receive, from user accounts, electronic messages, at least one of the electronic messages including a to field indicating an address of a user, a from field indicating a user account that created the message, and a body including textual content and a Uniform Resource Locator (URL);

maintain the electronic messages received by the user;

retrieve, more than once, a file identified by the URL from a remote server identified by the URL included in the electronic message;

subsequent to each retrieval, determine whether content of the file identified by the URL meets a trigger condition; and based on determining that the file identified by the URL meets the trigger condition, cause a client computing system associated with the user to modify a presentation of the at least one electronic message on the client computing system, the modifying the presentation of the at least one electronic message including adding a textual description of the trigger condition being met.

2. The non-transitory computer-readable storage medium of claim 1, wherein the trigger condition includes a price of an item, which is described by the file, meeting or passing a threshold.

3. The non-transitory computer-readable storage medium of claim 1, wherein the presentation of the at least one electronic message includes a hyperlink to the file.

4. A method comprising:

maintaining, by a server, electronic messages received by a user, the electronic messages including a to field indicating an address of the user, a from field indicating an account that created the message, and a body including textual content and at least one Uniform Resource Locator (URL) identifying at least one webpage;

instructing a client device to present at least one of the electronic messages; retrieving content from the at least one identified webpage; determining that a priority of the at least one of the electronic messages is not high enough to modify an appearance of the at least one of the electronic messages based on the textual content and the retrieved content;

receiving updated content from the at least one identified webpage; determining that the priority of the at least one of the electronic messages is high enough to modify the appearance of the at least one of the electronic messages based on the textual content and the received updated content; and instructing the client device to change the appearance of the at least one of the electronic messages based on the determination that the priority of the at least one of the electronic messages is high enough to modify the appearance.

5. The method of claim 4, further comprising: inserting text included in the at least one identified webpage into the textual content of the at least one of the electronic message messages, wherein the determining the priority of the at least one electronic message includes determining whether the retrieved content meets a trigger condition.

6. The method of claim 4, further comprising: copying Hypertext Markup Language (HTML) content stored in a datacenter in association with the at least one identified webpage and inserting the copied HTML content into the textual content of the at least one of the electronic messages, wherein the determining the priority of the at least one of the electronic messages includes determining whether the at least one of the electronic messages with the copied HTML content meets a trigger condition.

7. The method of claim 4, wherein the retrieving content comprises retrieving Hypertext Markup Language (HTML) content from a server identified by the at least one identified webpage and inserting the retrieved HTML content into the textual content.

8. The method of claim 4, wherein the determining the priority of the at least one of the electronic messages comprises determining that inventory for an item offered for sale at the at least one webpage has dropped below a threshold.

9. The method of claim 4, wherein the determining the priority of the at least one of the electronic messages comprises determining that a price of an item offered for sale at the at least one identified webpage has dropped by at least a threshold amount.

10. The method of claim 4, wherein the determining the priority of the at least one of the electronic messages comprises determining that a sale of an item featured at the at least one webpage has commenced.

11. The method of claim 4, wherein the determining the priority of the at least one of the electronic messages comprises determining that a value of an item monitored at the at least one identified webpage has changed by at least a threshold amount.

12. The method of claim 4, wherein the changing the appearance comprises changing a color of the at least one of the electronic messages.

13. The method of claim 4, wherein the changing the appearance comprises changing a location of the at least one of the electronic messages on a display.

14. The method of claim 4, wherein the changing the appearance comprises generating an icon adjacent to the at least one of the electronic messages.

15. The method of claim 4, wherein the electronic messages include at least one hyperlink to the at least one webpage identified by the URL.

16. The method of claim 4, further comprising:
    after retrieving the content from the at least one identified webpage, retrieving updated content from the at least one identified webpage;
    determining updated priorities of the electronic messages based on the textual content and the updated retrieved content; and
    instructing the client device to change the appearance of the at least one of the electronic messages based on the updated determined priority.

17. The method of claim 4, wherein the changing the appearance includes adding a textual description of the retrieved content.

18. A non-transitory computer-readable storage medium comprising instructions stored thereon that, when executed by at least one processor, are configured to cause a server computing system to at least:
    maintain electronic messages associated with a user account, at least one of the electronic messages including a to field indicating an address of the user account, a from field indicating an account that created the message, and a body including textual content and a Uniform Resource Locator (URL);
    constantly monitor a file identified by the URL to determine whether content of the file identified by the URL meets a trigger condition, the trigger condition including at least one of: fewer than a threshold number of tickets offered for sale being left; a sale of an item commencing;
    a price of an item offered for sale going below a threshold price;
    a price of an item offered for sale declining by a threshold value;
    a price of an item offered for sale declining by a threshold percentage;
    stocks reaching a threshold value; or
    a value of stocks changing by at least a threshold amount; and based on determining that the file identified by the URL meets the trigger condition, causing a client computing system associated with the user account to modify a presentation of the at least one of the electronic message messages on the client computing system, the modifying the presentation of the at least one of the electronic messages including adding a textual description of the trigger condition being met.

19. The non-transitory computer-readable storage medium of claim 18, wherein:
    the instructions are further configured to cause the server computing system to receive at least one trigger parameter in association with the user account; and
    the trigger condition is based on the received at least one trigger parameter.

* * * * *